US006520668B1

(12) United States Patent
Reiss

(10) Patent No.: US 6,520,668 B1
(45) Date of Patent: Feb. 18, 2003

(54) MOTOR VEHICLE HEADLIGHT WITH AN ACTIVE BASE ZONE

(75) Inventor: Benoit Reiss, Paris (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/528,340

(22) Filed: Mar. 17, 2000

(51) Int. Cl.[7] .................................................. B60Q 1/00

(52) U.S. Cl. ........................ 362/516; 362/514; 362/518; 362/297; 362/346; 362/215

(58) Field of Search ................................. 362/514, 516, 362/518, 297, 346, 215

(56) References Cited

U.S. PATENT DOCUMENTS

| | | | | |
|---|---|---|---|---|
| 4,964,021 A | * 10/1990 | Masin | 362/61 |
| 5,446,639 A | * 8/1995 | Hamanaka et al. | 362/350 |
| 6,050,711 A | * 4/2000 | Li | 362/517 |
| 6,224,246 B1 | * 5/2001 | Natsume et al. | 362/518 |
| 6,210,027 B1 | * 4/2002 | Fadel et al. | 362/518 |

FOREIGN PATENT DOCUMENTS

| | | |
|---|---|---|
| FR | 454342 | 7/1913 |
| FR | 802570 | 9/1936 |

OTHER PUBLICATIONS

French Search Report dated Dec. 1, 1999.

* cited by examiner

*Primary Examiner*—Sandra O'Shea
*Assistant Examiner*—Anabel Ton
(74) *Attorney, Agent, or Firm*—Morgan & Finnegan, LLP

(57) ABSTRACT

A motor vehicle headlight has a light source cooperating with a reflector to produce a light beam. The reflector has an active base region immediately behind the light source, and is arranged to reflect the radiation from the source to produce a beam of given photometry. The said base region includes, in at least one zone from which light would, in the absence of the invention, be reflected back to the close vicinity of the light source, a corrected reflective surface which produces corrected radiation that remains spaced away from the vicinity of the source without disturbing the photometry. Reflection back to the source, and consequently the danger of overheating the source and/or production of parasitic images, are eliminated.

16 Claims, 5 Drawing Sheets

FIG_3
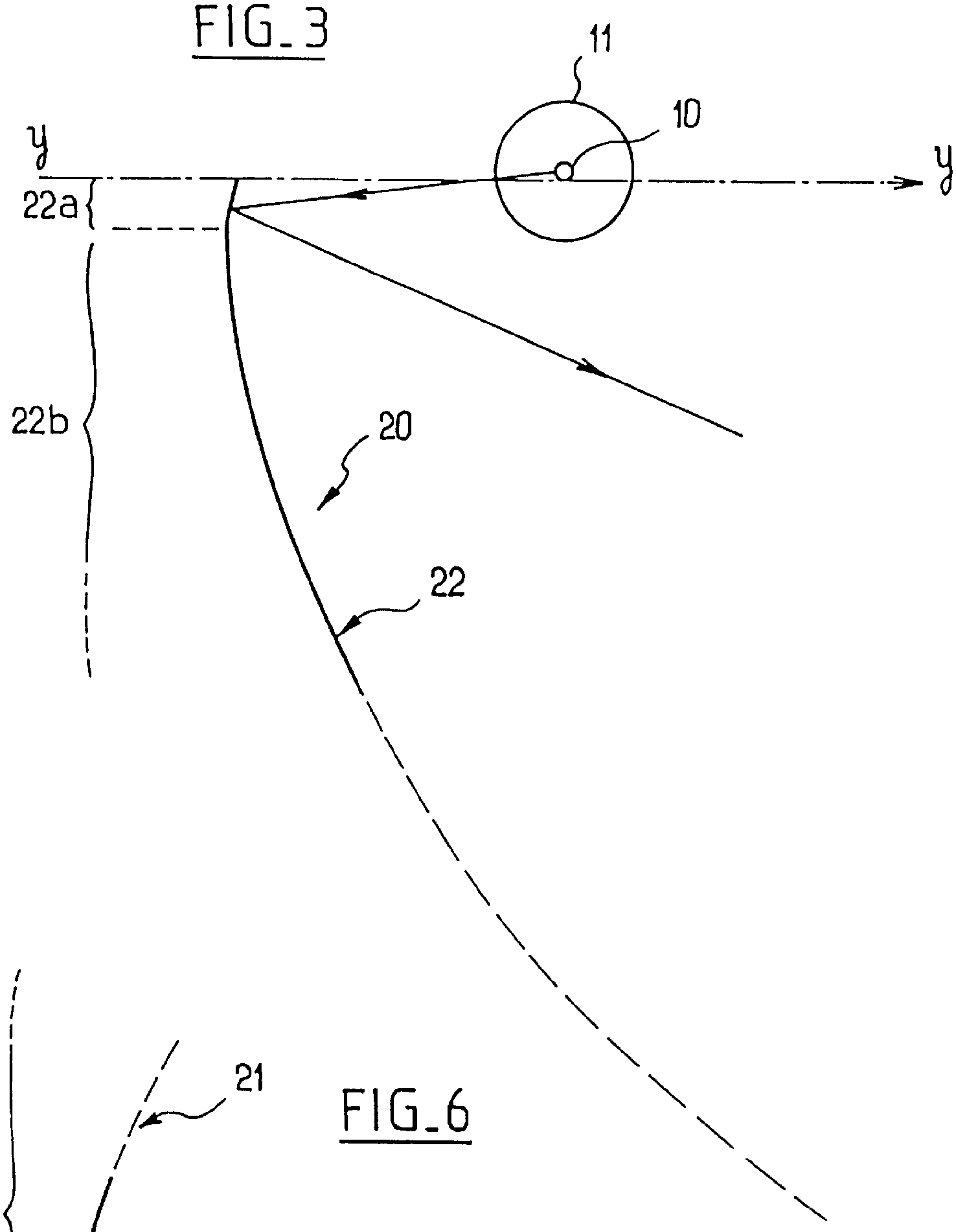
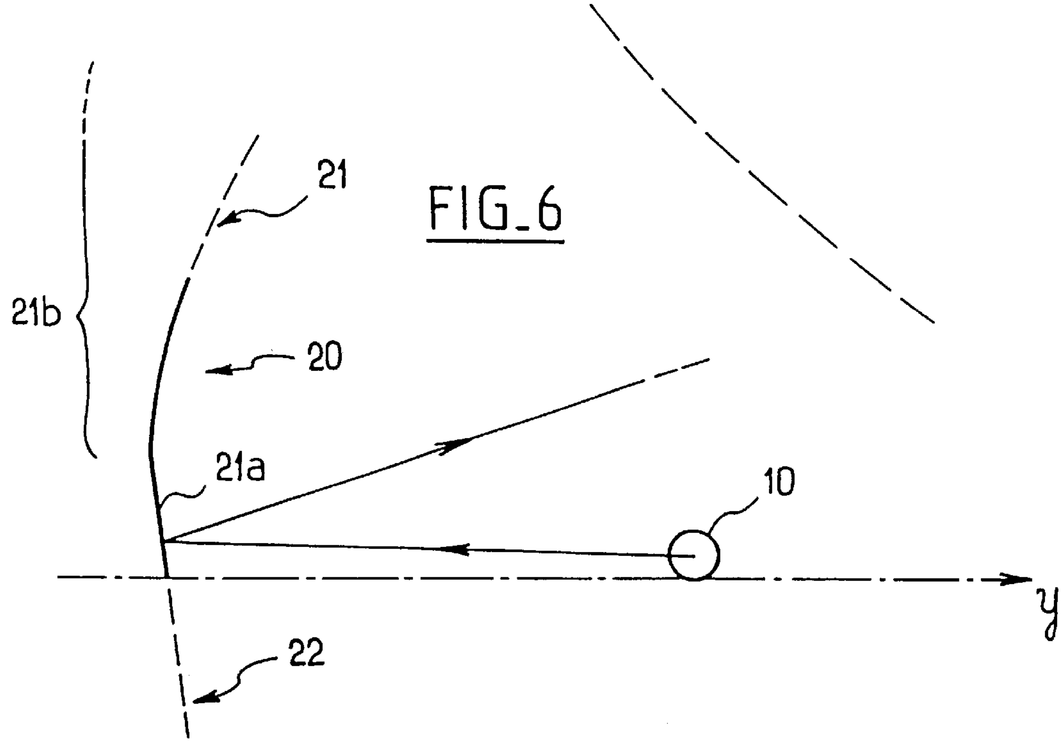
FIG_6

MOTOR VEHICLE HEADLIGHT WITH AN ACTIVE BASE ZONE

FIELD OF THE INVENTION

The present invention relates in general terms to motor vehicle headlights.

BACKGROUND OF THE INVENTION

There is at the present time a tendency to mount the lamp of such a headlight in its reflector in a generally transverse orientation, which may typically be either vertical or lateral, with respect to the optical axis of the reflector which defines the general direction taken by the beam emitted by the light. Such an arrangement has various advantages, in particular a reduction in the axial size of the headlight, because there is no need to provide any free space behind the latter to enable the lamp to be replaced. In addition, the lamp is made more accessible.

A further advantage of such an arrangement is that the base region of the reflector, which is traditionally occupied by the lamp hole through which the lamp is fitted axially into the reflector, is in this case available to play a part in the formation of the beam. This enables a more intense beam to be obtained.

However, the fact that the base region of the reflector plays a part in the formation of the beam gives rise to another difficulty. This is that the rays which are emitted by the lamp towards the base of the reflector are reflected by the base in a direction such that they then travel back towards the lamp. These rays are then absorbed, and/or wholly or partly diverted by total reflection, on the bulb of the lamp, so that they once again leave the headlight in the form of parasitic radiation which alters the quality of the overall beam. In particular, in the case where the headlight is intended to produce a cut-off beam, such as a dipped beam or fog penetrating beam, these diverted rays can leave the headlight in an upward direction, and give rise to dazzling of the drivers of vehicles traveling in the opposite direction.

One known solution to this problem consists in designing the direct light trap or mask, which is usually provided in front of the lamp in order to intercept the radiation emitted by the light source directly towards the cover glass, so that it will also intercept this parasitic radiation. However, this solution has a disadvantage in that this light is then lost. In addition, some of the light reflected from the base of the reflector does in fact once again reach the light source and is absorbed by it. This can increase the working temperature of the light source, and therefore reduce its useful life. This problem can be made worse by heating of the direct light mask due to absorption of the intercepted radiation.

In addition, an arrangement in which the base of the reflector is masked, or indeed made non-reflective, will not be any more satisfactory. In this connection, it could be ugly from the aesthetic point of view when the headlight is extinguished, and could make it more complicated to manufacture. In addition, a not insignificant quantity of light will then be lost, and its absorption by the reflector will tend to give rise to undesirable heating of the reflector.

DISCUSSION OF THE INVENTION

An object of the present invention is therefore to overcome the above mentioned limitations in the state of the art, and to propose a headlight in which the base region of the reflector is able to be used for playing a useful part in producing the headlight beam.

Another object of the present invention is to make use of the base zone to increase the thickness of the beam, especially where the light source is oriented in a horizontal direction at right angles to the optical axis, which in itself gives rise to risks of producing a beam which is too thin.

According to the invention, a motor vehicle headlight including a light source cooperating with a reflector to form a light beam, the reflector having an active base region situated immediately behind the light source, and the reflector being adapted to reflect the radiation produced by the light source so as to generate a beam of given photometry, is characterised in that the said base region includes, in at least one zone which, in order to satisfy the required photometry, is adapted to reflect the radiation from the light source into the close vicinity of the latter, a corrected reflective surface which is adapted to produce, from the light source, a corrected reflected radiation which remains spaced away from the said close vicinity without disturbing the photometry of the beam.

The corrected reflected radiation is preferably propagated outside a bulb surrounding the light source.

Preferably, the light source extends substantially horizontally and transversely to an optical axis of the reflector; the reflector is constructed, at least in its central region, from a vertical generatrix which is adapted to align substantially all of the images of the light source below a cut-off line; in that the said corrected reflective surface occupies a zone of the reflector which is low in height and which is located substantially at the same level as the light source, the corrected reflective surface having a corrected vertical generatrix such that the corrected reflected radiation is substantially spaced away from the horizon in the vertical direction.

Preferably in that case, at least part of the corrected reflected radiation is directed downwards towards the road, and is adapted so that it directly completes the light beam formed by the reflector while increasing its downward thickness.

In another version, at least part of the corrected reflected radiation is diverted downwards towards a lower region of the reflector, and is adapted so that, after being reflected by the said lower region, it completes the light beam which is formed by the said reflector while increasing the downward thickness of the latter.

In a further version, at least part of the corrected reflected radiation is redirected upwardly towards a region of the solid angle defined in space in front of the vehicle that corresponds to the position of gantry-mounted road signs with respect to the road.

Preferably, the reflector includes first and second zones, having a first and a second corrected reflective surface respectively and lying, respectively, immediately above and below a horizontal plane downwardly tangential to the light source.

Preferably in that case, the first corrected reflective surface redirects the light downwards towards the reflector, and the second corrected reflective surface redirects the light downwards towards the road; and/or the first corrected reflective surface redirects the light upwardly towards a region corresponding to gantry-mounted road signs, while the corrected reflective surface redirects the light downwards towards the road.

Preferably, at least one of the following features is present, to the extent that they are compatible:

- the said corrected reflective surface, or at least one-said surface, has an essentially rectilinear vertical generatrix;

the said corrected reflective surface, or at least one said surface, has a curved vertical generatrix;

the said corrected reflective surface, or at least one said surface, has a vertical generatrix which is joined without change of slope to at least one other part of the reflector.

Preferably, the corrected reflective surface, or at least one said surface, has a substantially constant height of between 2 and 6 mm.

Preferably, the corrected reflective surface, or at least one said surface, extends over the whole width of the reflector.

Preferably, the corrected reflective surface, or at least one said surface extends over part of the width of the reflector covering at least one region situated immediately behind the light source.

Further features, objects and advantages of the present invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 3 is a detail view in vertical axial cross section of the reflector and lamp of FIG. 1, with the mirror having a first modified zone in accordance with the invention.

FIG. 6 shows in partial vertical axial cross section a further version of a headlight in accordance with the invention.

DESCRIPTION OF PREFERRED EMBODIMENTS OF THE INVENTION

Figure 1:
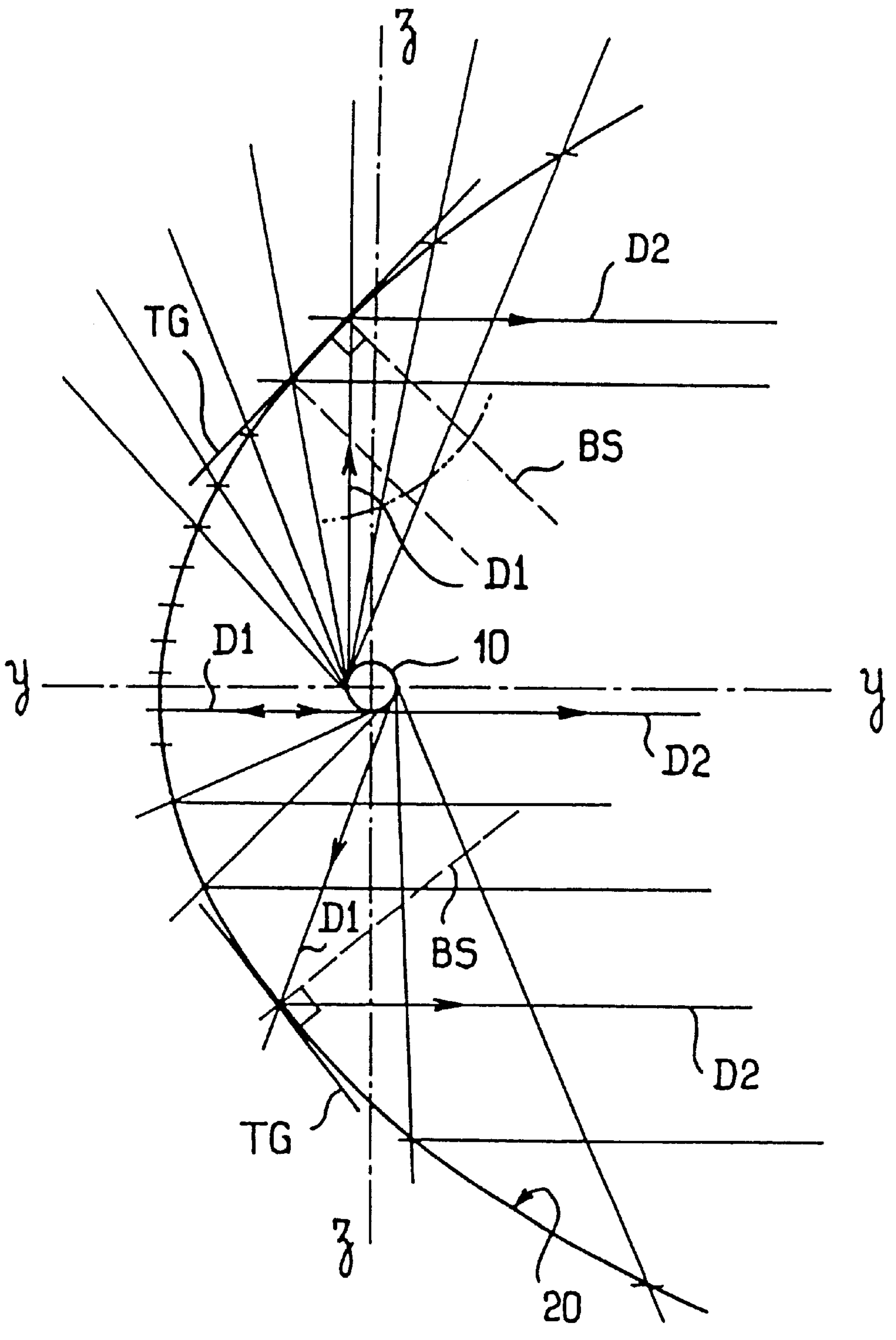
FIG. 1 is a diagrammatic view in vertical axial cross section, of a transverse filament and a reflector to which the present invention can be applied.
Figure 2:
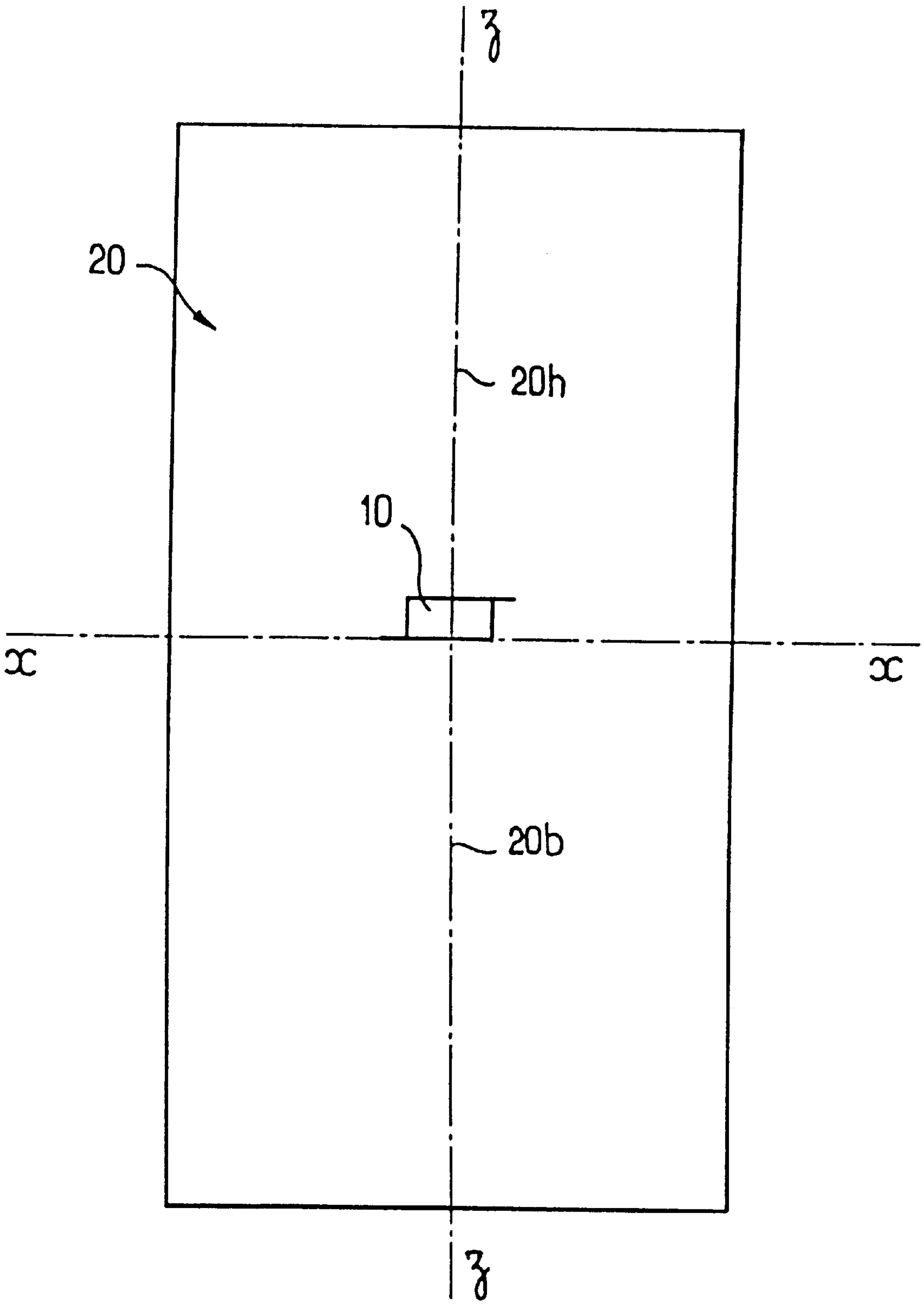
FIG. 2 is a front view of the filament and reflector of FIG. 1.

Reference is first made to FIGS. 1 and 2, which show components of a motor vehicle headlight, namely the generally cylindrical filament 10 of its lamp, and its reflector 20. Other elements of the headlight, namely its casing, its cover lens and various auxiliary items of equipment, are not shown but are conventional in themselves. In another version, however, the light source could consist for example of the generally cylindrical arc of a discharge lamp.

The axis of the filament 10 extends horizontally and at right angles to the optical axis y—y of the reflector. It may typically consist of the axial filament of an lamp H1 or H7 type lamp, oriented laterally in the reflector.

An essential feature of this reflector is that the upper and lower vertical generatrices, indicated in FIG. 2 at 20*h* and 20*b* respectively, of the reflector 20 are so designed as to bring all of the images of the filament 10 into the horizontal level, so that high quality overall cut-off beams can be generated.

More precisely, and with reference in particular to FIG. 1, the generatrices are constructed by drawing lines D1 tangential to the surface of the filament 10, these lines being on the rear side of the filament as regards the upper generatrix 20*h*, and on the front side of the filament as regards the generatrix 20*b*. Straight lines B2 are associated, respectively, with each of the straight lines D1 corresponding to a light beam emitted by an edge of the filament 10. The straight lines D2 are parallel to the optical axis y—y of the mirror, which is itself substantially parallel to the axis of the vehicle.

For each pair of straight lines (D1, D2) their bisector BS, and the straight line TG which is at right angles to this bisector, are determined. Each generatrix is constructed bit by bit, starting from the base of the reflector 20 which is fixed in a predetermined position with respect to the filament. It is constructed from the various straight lines TG which are obtained, so as to define a curved line which may be referred to as an “evolved generatrix”, because it does not have a fixed focus but a set of foci which evolve progressively with displacement along the generatrix. This distinguishes these generatrices from conventional parabolic generatrices with a fixed focus.

In this example it will be understood that by altering the horizontal distance between the base of the reflector 20 and the filament 10, it is thereby possible to design generatrices 20*a* and 20*b* which are open or closed around the light source to a greater or lesser extent, thereby varying, firstly, the size of the images of the filament that are produced, and secondly, the quantity of light flux which the reflector recuperates over a given height.

The differential equation of the generatrices 20*h* and 20*b*, which is easy to solve with the assistance of a computer, can be expressed as follows:

$$\Delta z=\Delta b.(z.\sin\beta-y.\cos\beta)$$

$$\Delta y=\Delta z.\tan(\beta/2)$$

with the following initial conditions:

$$z=-Rfil$$

$$y=-F$$

where:

(y, z) are the normal orthogonal axes, the origin of which is at the centre of the filament 10; the y axis is the horizontal optical axis, while the z axis is the vertical optical axis;

Rfil is the radius of the filament; and

F is the distance measured along the y axis between the centre of the filament and the base of the reflector.

It will be understood that, with a design of this kind for the generatrices 20*h*, 20*b*, the result is achieved that each image of the filament 10 which they produce is situated immediately below and on the edge of a horizontal cut-off line which passes through the axis y—y.

From this it is possible to generate different types of beam, the width of which, in particular, can be adjusted by varying the horizontal generatrix of the reflective surface of the reflector 20.

In a basic version, the horizontal generatrix is given a parabolic appearance, with a focus which may be either centred on the filament 10, or (and preferably) be offset laterally from the latter, and the vertical generatrix described above can be slid along the horizontal generatrix, with this sliding movement consisting of straight line movement without translation of the vertical generatrix, that is to say it remains parallel to the plane yOz along the horizontal generatrix. In that case, the equation of the horizontal generatrix is expressed for example as follows:

$$y=0.25[x+|x|/x.Lfil.|z|/(2\ z)2/(F+\delta F)]-F$$

where:

x, y, z are the coordinates of the current point;

F is the focal base distance described above with respect to the vertical generatrix;

δF is the value of the lateral offset of the axis of the horizontal parabolic generatrix with respect to the centre of the filament; and Lfil is the half length of the filament measured along the $\overline{x}$ axis.

In another version, it is possible to make use of the horizontal generatrix consisting of two half-parabolas, on the left and the right respectively, which are focused respectively in the vicinity of the left and right hand ends of the filament 10, so as to produce a beam already spread in width while respecting the horizontal cut-off.

Any other generatrix can naturally be envisaged, according in particular to the lateral distribution which is desired for the light.

As will be seen in FIG. 1, when the lamp is fitted in the reflector either from above or from the side, the base of reflector is available to participate in forming the beam. The vertical generatrix described above is then such that the base reflects a substantial quantity of light towards the light source, and this gives rise to the problems explained in the introduction of this specification.

Reference is now made to FIG. 3, which shows a vertical generatrix having a lower part (i.e. below the axis y—y) which has been modified immediately underneath the horizontal plane which contains the axis y—y, so that the radiation which is reflected by a limited zone of the base of the reflector is propagated at a distance from the light source 10. Thus, the lower part 22 of the reflector includes a main zone 22*b* which extends over the major part of its height, and a corrected zone 22*a*, the vertical axial cross section of which is a straight line in this example. This section can of course also take a curved form, which may for example be parabolic, with a focal length which is substantially greater than the horizontal distance between the base of the reflector and the light source.

The orientation of this corrected zone 22*a* is preferably such that the mean direction of the reflected radiation passes substantially below the bulb 11 of the lamp. For example, in the case where the focal length of the vertical generatrix of the reflector is 22 mm, a zone 22*a* can be provided having a height which is of the order of 5 mm, with its orientation being such that the radiation issuing from the light source is reflected with a downward inclination of between about 0° and about 11°. This is particularly appropriate where it is desired to increase the quantity of light close to the vehicle, especially in the case where the headlight is a headlight of a heavy goods vehicle.

In general terms, it is of advantage to choose the position and height of the corrected zone 22*a* in such a way that it lies approximately between the height of the base of the filament and the height of the base of the bulb of the lamp.

However in some cases there can be a requirement for the lower limit of the zone 22*a* to lie slightly above the base of the bulb. This has the advantage that it masks the transition line which can be seen as a bend or even an interruption, between the zone 22*a* and the adjacent zone 22*b*.

It is of course-also useful to provide a corrected reflective zone in the upper part 21 of the reflector, that is to say the part that lies above the axis y—y. However, in this case it will be understood that, in order to allow the reflected radiation to pass below the light source, it is necessary to give it a sharper downward inclination than in the case of the corrected zone 22*a* described above. As a result of this, the radiation will no longer play a useful part in the beam produced. In addition, such downward rays involve the danger, in certain forms of headlight construction, that an embellisher or styling mask, in particular, which is provided at the front of the reflector as an extension of the lower part of the latter, may be interfered with. Again, a reflector for a cruising headlight situated above the reflector of the invention may similarly be interfered with.

Figures 4, 5:
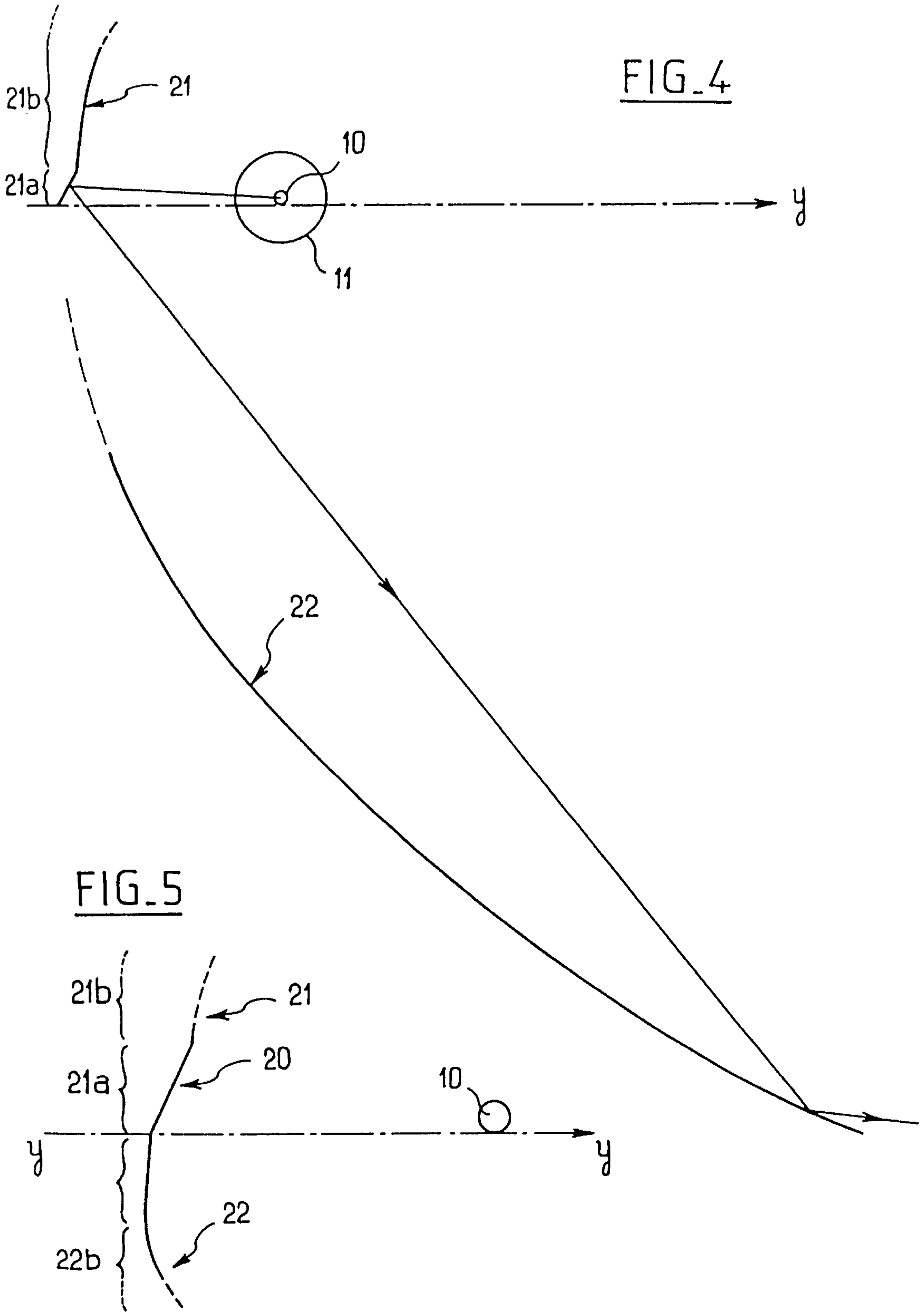
FIG. 4 is a view similar to FIG. 3, showing a second modified zone of the reflector according to the invention.
FIG. 5 shows part of the mirror of the invention, incorporating both the first and second modified zones.

Thus, and with reference now to FIG. 4, it is of advantage in this case to provide a corrected zone 21*a* which, here again, has a profile which is either straight or curved, and which is inclined in such a way as to redirect the radiation towards the lowest region of the lower part 22 of the reflector. Because the light reflected in this way towards this region comes from a location which is situated behind the light source 10, it will be understood that the second reflection of this light by the said region will give rise to radiation which is directed downwards with respect to the horizontal. Here again, the beam is again reinforced close to the vehicle, and dazzling is avoided.

It will be observed that such an approach can also be used for the corrected zone 22*a*, with the corrected zones 21*a* and 22*a* then being arranged substantially as extensions of each other.

Referring now to FIG. 5, this shows the base region of the reflector 20, with the corrected zones 21*a* and 22*a* as described above.

In another version of a headlight according to the invention, the zone 21*a*, and if necessary the zone 22*a*, can be so arranged that the radiation reflected from it is propagated above the horizontal, with an angle to the horizontal which is greater than about 10 to 20°.

A reflector having a zone 21*a* arranged in this way is shown in FIG. 6, to which reference is invited. A solution of this kind enables problems of passing round the lamp to be avoided by passing below the latter, while giving rise to a light flux which has a very much moderated intensity and which, firstly, has an upward inclination such that it passes below the drivers of vehicles traveling in the opposite direction, and secondly such that it enables a so-called "gantry zone", corresponding to the gantry-mounted road signs which are typically found on motorways, thruways and other roads, to be illuminate within the solid angle in front of the vehicle.

In this connection, it is general experience that, with conventional cruising headlights designed to obtain a high cut-off contrast (with the consequence that there is very little light in the gantry zone), gantry mounted signs are insufficiently illuminated.

The photometric modifications obtained with the present invention will now be described with reference to a specific example of a headlight. This headlight is equipped with a "H7" normalised type of lamp mounted transversely within the reflector. The reflector has a corrected zone 22*a* which has a height of 3 mm, and its vertical generatrix is a vertical straight line which is accordingly joined continuously to the upper part 21 of the reflector at the level of a transition contained within a horizontal plane tangential through the base of the filament (that is to say the plane containing the axis y—y). The zone 22*a* extends over the whole width of the reflector. The upper part 21 of the reflector in this example does not have any corrected zone.

Figure 7A:
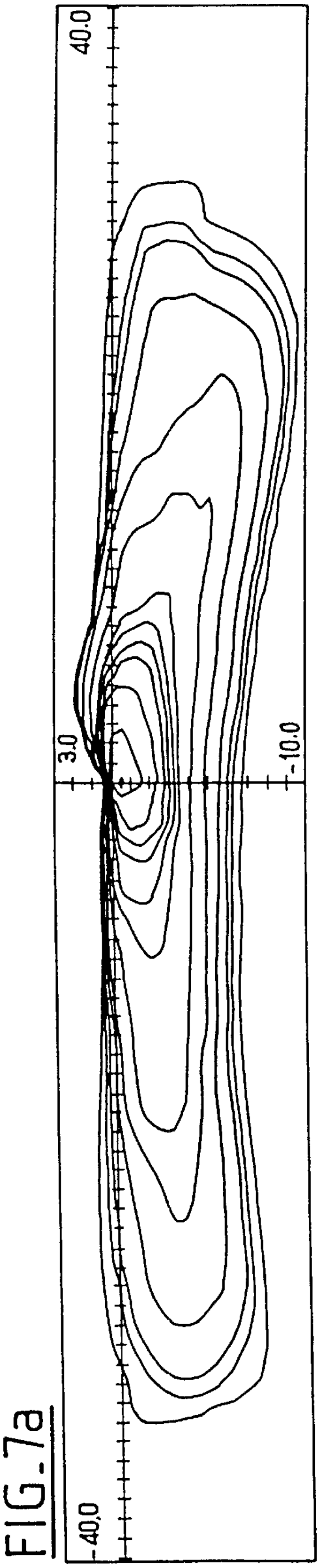
FIGS. 7*a* to 7*c* show, by means of sets of isolux curves projected on a screen, the behaviour of a headlight according to the invention in photometric terms, with the reflector exposed (i.e. no cover lens).
Figure 7B:
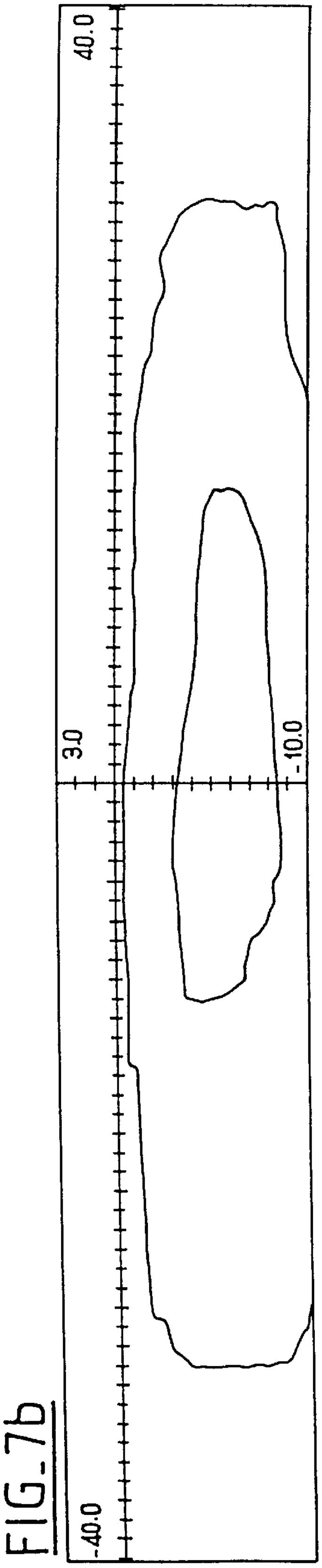
Figure 7C:
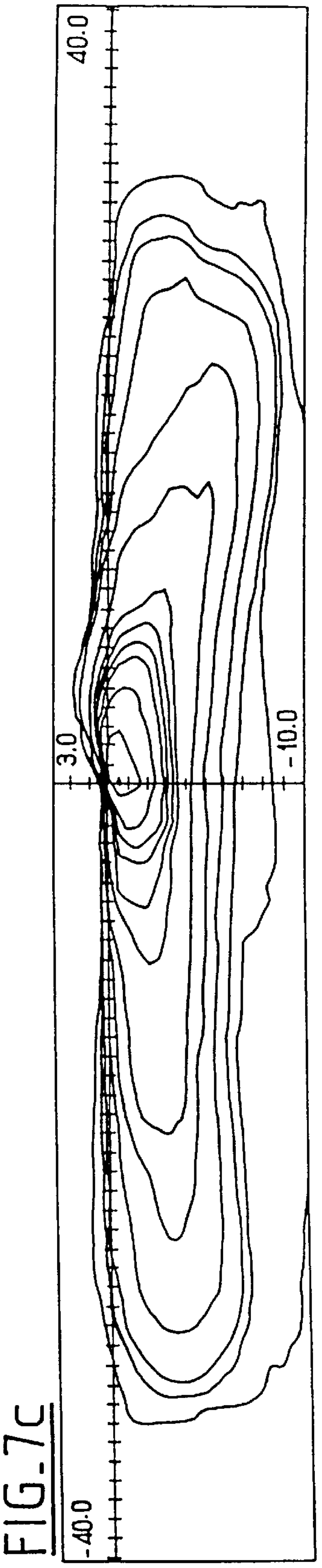

With reference now to FIG. 7*a*, this shows the beam obtained with the upper part 21 and the zone 22*b* of the reflector, while FIG. 7*b* shows the appearance of the part of the beam which is obtained with the corrected zone 22*a*. Finally, FIG. 7*c* shows the appearance of the overall beam produced by the headlight in the absence of any cover lens.

It will be observed that the zone 22*a*, while avoiding the problems of parasitic light and heating mentioned in the introduction of this specification, does enable the light close to the vehicle to be reinforced slightly.

The present invention is of course in no way limited to the embodiments described and shown, but the person skilled in this technical field will be able to apply to it any variation or modification which conforms with the spirit of the invention. In particular, although in the foregoing description, corrected zones have been described which extend over the whole width of the reflector, it is of course possible to arrange that the corrected zone or zones extend only over a part of the horizontal extent of the reflector, and in particular that which lies immediately behind the light source.

What is claimed is:

1. A motor vehicle headlight comprising a light source and a reflector adjacent the light source for cooperation with the light source to produce a light beam, the reflector having an optical axis at a right angle to a horizontal axis of said light source and an active base region intersected by the optical axis immediately behind the light source, and the reflector being adapted to reflect radiation from the source to produce a said beam of given photometry, wherein the said base region comprises at least one zone so configured with respect to the light source that, in order to satisfy the said predetermined photometry, light from the source is reflected by the said at least one zone back towards the close vicinity of the light source, and wherein the active base region further includes a corrected reflective surface intersected by the optical axis adapted to produce from the light source corrected reflected radiation which reraces spaced away from the said close vicinity of the light source without disturbing the photometry of the beam.

2. A headlight according to claim 1, further including a bulb surrounding the light source, the said corrected reflective surface being such that the corrected reflected radiation produced thereby is propagated outside the said bulb.

3. A headlight according to claim 1, wherein the reflector has a central region and defines a vertical generatrix, the light source extending substantially horizontally and transversely with respect to the optical axis, and the reflector having, at least in the said central region, a profile generated from the vertical generatrix in such a way as to be capable of aligning substantially all of the images of the light source below a cut-off line, the reflector further having a zone of shallow height substantially at the same vertical level as the light source, the said corrected reflective surface being in this said zone, and the reflector further defining a corrected vertical generatrix such that the corrected reflected radiation is substantially spaced away from the horizon in the vertical direction.

4. A headlight according to claim 3, wherein the corrected reflective surface is so configured as to redirect the corrected reflected radiation downwardly towards the road and to complete, directly, the light beam formed by the reflector while increasing the downward thickness of the beam.

5. A headlight according to claim 3, wherein the reflector includes a lower region, and wherein the corrected reflective surface is so disposed that at least part of the corrected reflected radiation is redirected downwardly towards the said lower region of the reflector, the reflector being such that, after reflection of the light by the said lower region, it completes the light beam formed by the said reflector while increasing the downward thickness of the beam.

6. A headlight according to claim 3 for a vehicle defining a solid angle in front of the vehicle and a region within said solid angle that corresponds to the position of gantry-mounted road signs above the road, wherein the corrected reflective surface is so arranged as to redirect at least part of the corrected reflected radiation upwardly towards the said region within the solid angle.

7. A headlight according to claim 3, defining a horizontal plane downwardly tangential to the light source, the reflector comprising a first corrected reflective zone immediately above the said plane and a second corrected reflective zone immediately below the said plane.

8. A headlight according to claim 7, wherein the first said zone has a first corrected reflective surface adapted to redirect the light downwardly towards the reflector, the second said zone having a second corrected reflective surface adapted to redirect the light downwardly towards the road.

9. A headlight according to claim 7, for a vehicle defining a solid angle in front of the vehicle and a region within said solid angle that corresponds to the position of gantry-mounted road signs above the road, wherein the said first zone has a first corrected reflective surface which is so arranged as to redirect at least part of the corrected reflected radiation upwardly towards the said region within the solid angle, the second said zone having a second corrected reflective surface adapted to redirect the light downwardly towards the road.

10. A headlight according to claim 1, wherein the said at least one corrected reflective surface is defined by an essentially straight vertical generatrix.

11. A headlight according to claim 1, wherein the said at least one corrected reflective surface is defined by a curved vertical generatrix.

12. A headlight according to claim 1, wherein the said at least one corrected reflective surface is defined by a vertical generatrix joined without interruption of slope to at least one other portion of the reflector.

13. A headlight according to claim 1, wherein the said at least one corrected reflective surface extends over a substantially constant height in the range 2 to 6 mm.

14. A headlight according to claim 1, wherein the said at least one corrected reflective surface extends over the whole height of the reflector.

15. A headlight according to claim 1, wherein the said at least one corrected reflective surface extends over part of the width of the reflector covering at least a region situated immediately behind the light source.

16. A motor vehicle headlight comprising a reflector having an optical axis at a right angle to a horizontal axis of a light source and a reflective base intersected by the optical axis; the light source being mounted on the headlight and lying on the optical axis, wherein the base is located behind the light source and reflects radiation emitted from the light source in front of the light source, wherein the base includes corrected reflective surface intersected by the optical axis which reflects radiation emitted by the light source as corrected reflected radiation away from the light source, and a zone adjacent the corrected reflective surface which reflects radiation emitted from the light source in the close vicinity of, but not directly at, the light source and projects images of the light source about and below the optical axis.

* * * * *

UNITED STATES PATENT AND TRADEMARK OFFICE
CERTIFICATE OF CORRECTION

PATENT NO. : 6,520,668 B1
DATED : February 18, 2003
INVENTOR(S) : Benoit Reiss

It is certified that error appears in the above-identified patent and that said Letters Patent is hereby corrected as shown below:

Title page,
Please add Item -- [30] Foreign Application Priority Data
March 17, 1999 (FR)......................99 03305 --

Column 7,
Line 36, please delete "reraces" and insert therefor -- remains --

Signed and Sealed this

Twenty-eighth Day of October, 2003

JAMES E. ROGAN
*Director of the United States Patent and Trademark Office*